United States Patent
Shinmei et al.

(10) Patent No.: US 6,248,226 B1
(45) Date of Patent: Jun. 19, 2001

(54) PROCESS FOR PRODUCING DEIONIZED WATER BY ELECTRODEIONIZATION TECHNIQUE

(75) Inventors: Yasutaka Shinmei, Toda; Minoru Kakuda, Bunkyo-ku, both of (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/194,780
(22) PCT Filed: Jun. 3, 1996
(86) PCT No.: PCT/JP96/01518
 § 371 Date: Feb. 23, 1999
 § 102(e) Date: Feb. 23, 1999
(87) PCT Pub. No.: WO97/46492
 PCT Pub. Date: Dec. 11, 1997
(51) Int. Cl.[7] .................................................. B01D 61/44
(52) U.S. Cl. ................................................ 204/632; 204/524
(58) Field of Search ...................................... 204/632, 524

(56) References Cited

U.S. PATENT DOCUMENTS 5,308,466 * 5/1994 Ganzi et al. ........................ 204/632
5,316,637 * 5/1994 Ganzi et al. ........................ 204/632

FOREIGN PATENT DOCUMENTS

| 52-047580 | 4/1977 | (JP) . |
| 4071624 * | 3/1992 | (JP) . |
| 7265865 | 10/1995 | (JP) . |
| 8150326 | 6/1996 | (JP) . |

* cited by examiner

Primary Examiner—Arun S. Phasge

(57) ABSTRACT

In producing deionized water by electrodeionization according to the present invention, feed water and concentrating water are flowed into the ion depletion compartments and the concentration compartments, respectively, in such a way that the current direction of feed water being fed into the ion depletion compartments is opposite to the current direction of concentrating water being fed into the concentration compartments. Further, feed water flowed into each ion depletion compartment is first passed through an anion exchange material layer, and subsequently passed through other ion exchange material layer(s). The migration of anions into the concentration compartments is promoted in the portions of such anion exchange material layers through which feed water is first passed. As a result, the silica removal rate is improved.

6 Claims, 2 Drawing Sheets

PROCESS FOR PRODUCING DEIONIZED WATER BY ELECTRODEIONIZATION TECHNIQUE

This application is a 371 of PCT/JP96/01518 filed Jun. 3, 1996.

TECHNICAL FIELD

The present invention relates to a process for producing, by electrodeionization, deionized water which can be used in a variety of industrial or reseach facilities, etc. in the semiconductor manufacturing industry, the pharmaceutical industry, the food industry, etc., and more particularly to a deionized water production process excellent in removal of silica.

BACKGROUND ART

A method wherein feed water is passed through ion exchange resins to effect deionization thereof has hitherto been known as a deionized water production process. In this method, however, the ion exchange resins, when exhausted with ions, must be regenerated with respective aqueous solutions of an acid and an alkali. In an effort to eliminate such a disadvantage involved in the foregoing treatment operation, an electrodeionization deionized water production process entirely without need of such regeneration with any chemicals has recently been established and put into practical use.

For this electrodeionization process, an ion exchange material(s) such as an ion exchange resin(s) or an ion exchange fiber(s) is filled between cation exchange membranes and anion exchange membranes to form ion depletion compartments, concentration compartments are provided on both outer sides of the ion depletion compartments, and the ion depletion compartments and the concentration compartments are disposed between an anode and a cathode. While applying a voltage, feed water is flowed into the ion depletion compartments and concentrating water is flowed into the concentration compartments. Impurity ions in the feed water are removed in the ion depletion compartments while electrically transferring the impurity ions to the concentration compartments to produce deionized water. Since the ion exchange material(s) is never saturated with ions according to this process, regeneration thereof with any chemicals is advantageously unnecessary.

However, the deionized water production process according to electrodeionization involves a problem of a low removal rate of silica in feed water. In order to solve this problem, the instant applicant has previously proposed electrodeionized water production equipment wherein ion exchange material layers through which feed water is first to be passed are anion exchange material layers (Japanese Patent Laid-Open No. 71,624/1992).

Although the silica removal rate can be improved using this equipment, the inventors of the present invention have made intensive investigations with a view to establishing a process for further increasing the silica removal rate. As a result, they have found out that the silica removal rate can be remarkably improved when the current direction of feed water being fed into ion depiction compartments is set opposite to the current direction of concentrating water being fed into concentration compartments while at the same time feed water flowed into the ion depletion compartments is first passed through respective anion exchange material layers. The present invention has been completed based on this finding.

An object of the present invention is to provide a process for producing deionized water by electrodeionization, wherein silica as an impurity in feed water can be removed at a very high removal rate.

DISCLOSURE OF THE INVENTION

In carrying out an electrodeionization deionized water production process wherein an anion exchange material and a cation exchange material are filled between cation exchange membranes and anion exchange membranes to form ion depletion compartments, concentration compartments are provided on both sides of the ion depletion compartments with the cation exchange membranes or the anion exchange membranes therebetween, and the ion depletion compartments and the concentration compartments are disposed between an anode and a cathode, and wherein feed water is flowed into the ion depletion compartments with application of a voltage while flowing concentrating water into the concentration compartments to remove impurity ions in feed water for production of deionized water; the present invention is characterized in that feed water and concentrating water are flowed into the ion depletion compartments and the concentration compartments, respectively, in such a way that the current direction of feed water being fed into the ion depletion compartments is opposite to the current direction of concentrating water being fed into the concentration compartments, while feed water flowed into the ion depletion compartments is first passed through respective anion exchange material layers.

In producing deionized water by electrodeionization wherein feed water is fed into the ion depletion compartments and concentrating water is fed into the concentration compartments, feed water and concentrating water are fed in mutually opposite current directions according to the present invention. More specifically, when feed water is passed through the ion depletion compartments in the downward current direction, concentrating water is passed through the concentration compartments in the upward current direction. On the other hand, when feed water is passed through the ion depletion compartments in the upward current direction, concentrating water is passed through the concentration compartments in the downward current direction.

Further, in the present invention, feed water flowed into the ion depletion compartments is first passed through the anion exchange material layers. More specifically, although there are various methods of how to arrange layers of such ion exchange materials as an anion exchange material and a cation exchange material to be filled in each ion depletion compartment, the layer arrangement in the present invention is determined in such a way that an ion exchange material layer through which feed water is first to be passed is an anion exchange material layer.

Accordingly, when the mode of feed water passage is downward current water passage, the anion exchange material layer is disposed in an upper portion of each ion depletion compartment with other ion exchange material layer(s) disposed thereunder. On the other hand, when that mode is upward current water passage, the anion exchange material layer is disposed in a lower portion of each ion depletion compartment with other ion exchange material layer(s) disposed thereon.

In the present invention, a partition wall may be either existent or nonexistent between the anion exchange material layer and other ion exchange material layer adjacent to the former layer. Thus, the two layers may be either in or out of contact with each other.

According to the present invention, since feed water and concentrating water are flowed into the ion depletion compartments and the concentration compartments, respectively, in such a way that the current direction of feed water being fed into the ion depletion compartments is opposite to the current direction of concentrating water being fed into the concentration compartments, while feed water flowed into the ion depletion compartments is first passed through the anion exchange material layers, the electric current density in the portions of the anion exchange material layers through which feed water is first passed is increased to promote the migration of anions into the concentration compartments, whereby the alkalinity of feed water in the portions of the anion exchange material layers becomes so strong that the dissociation of silica proceeds, with the result that the silica removal rate can be greatly improved as compared with those in conventional processes.

BEST MODES FOR CARRYING OUT THE INVENTION

The present invention is directed to deionized water production according to electrodeionization. In carrying out the present invention, use is made of electrodeionized water production equipment comprising ion depletion compartments filled with ion exchange materials between cation exchange membranes and anion exchange membranes; concentration compartments provided on both sides of the ion depletion compartments with the cation exchange membranes or the anion exchange membranes therebetween; and an anode and a cathode respectively disposed on the two outer sides thereof.

Figure 1:
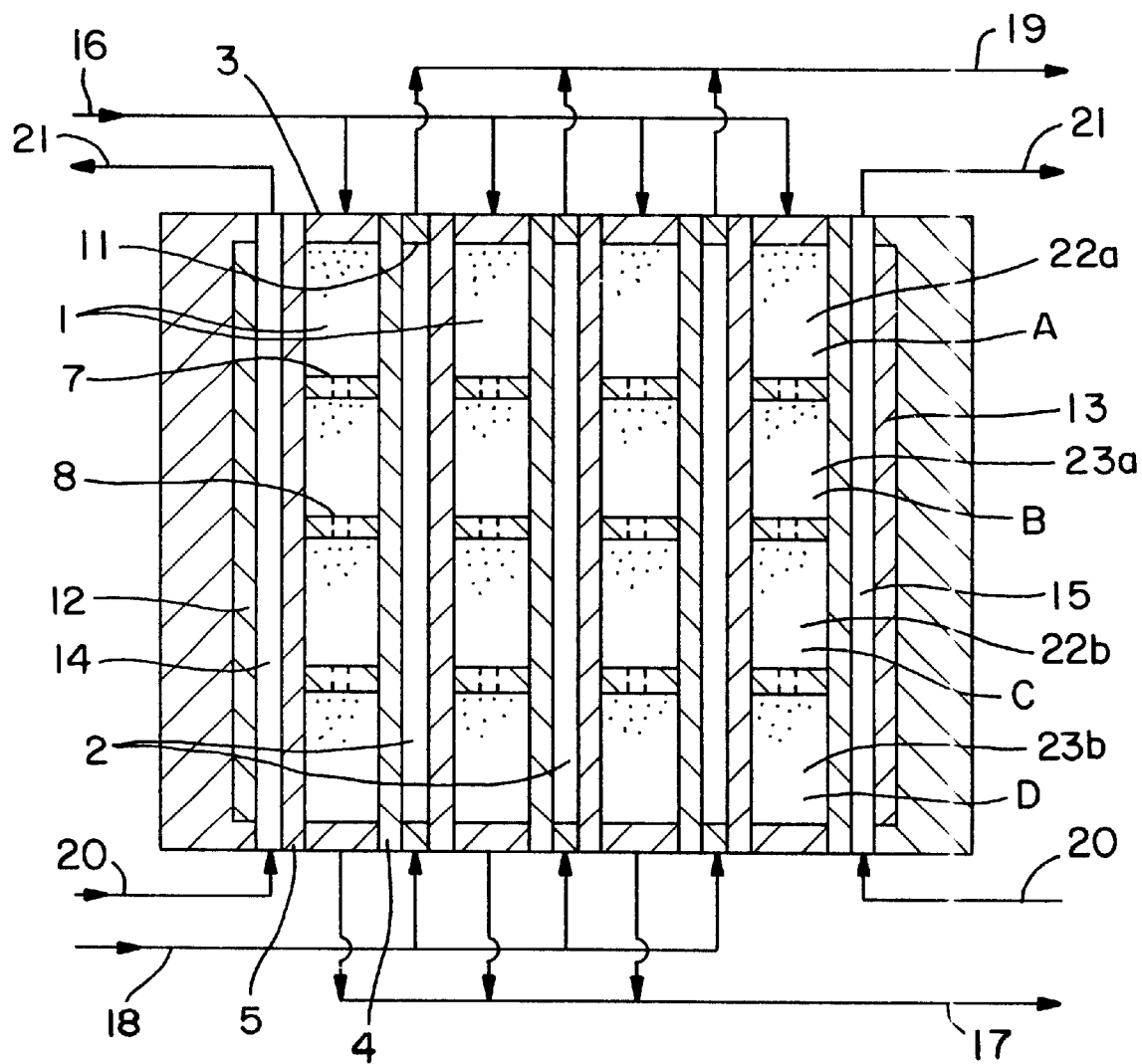
FIG. 1 is a schematic longitudinal cross-sectional view illustrating an example of electrodeionized water production equipment to be used for carrying out the process of the present invention.

An example of the structure of such electrodeionized water production equipment is shown in FIG. 1. The present invention will now be described in detail by taking as an example a case of producing deionized water using equipment as shown in FIG. 1.

Figure 2:
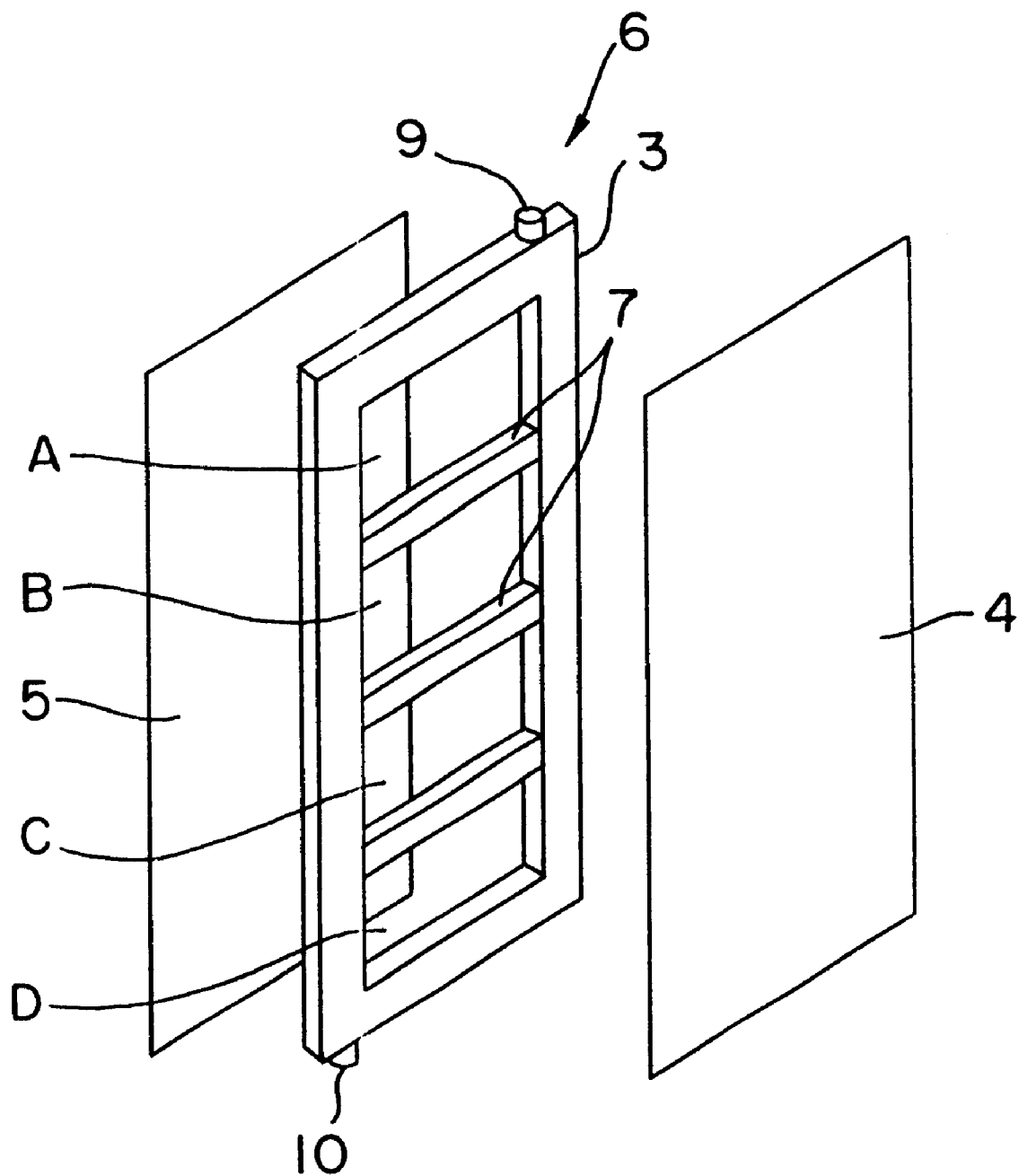
FIG. 2 is an exploded perspective view illustrating a deionization module for constituting an ion depletion compartment.

The structure of the equipment shown in this figure will be described. Numeral 1 refers to ion depletion compartments, and 2 to concentration compartments. A plurality of the ion depletion compartments 1 are provided alternately with a plurality of the concentration compartments 2. An ion depletion compartment 1 is usually made up in the form of a module piece. More specifically, a cation exchange membrane 4 and an anion exchange membrane 5 are respectively adhered to the two faces of a framework 3 made up in the form of a quadrilateral frame as shown in FIG. 2 from, for example, a synthetic resin to provide an internal space, which is filled with ion exchange materials such for example as ion exchange resins (a cation exchange resin and an anion exchange resin) to fabricate a deionization module 6. The ion exchange resins-filled portion in the deionization module 6 is formed as the ion depletion compartment 1.

As described above, the cation exchange resin and the anion exchange resin are filled in the space portion between the cation exchange membrane and the anion exchange membrane. When the mode of feed water passage is downward current water passage, the method of filling these ion exchange resins, i.e., the method of arranging ion exchange resin layers, is such that an anion exchange resin layer is disposed in an upper portion of each ion depletion compartment 1 with other ion exchange resin layer(s) disposed thereunder.

Accordingly, modes of layer arrangement of ion exchange resin layers in each ion depletion compartment 1 include a mode wherein a layer of the anion exchange resin is in an upper portion of the ion depletion compartment 1 with a layer of the cation exchange resin thereunder, a mode wherein at least two repeating sets of an upper layer of the anion exchange resin and a lower layer of the cation exchange resin for a layer-built portion are provided in this order, a mode wherein one set or at least two repeating sets of an upper layer of the anion exchange resin and a lower layer of the cation exchange resin for a layer-built portion are provided with a mixed ion exchange resin layer of a cation exchange resin and an anion exchange resin provided further thereunder, and a mode wherein a layer of the anion exchange resin is in the upper portion with such a mixed ion exchange resin layer thereunder.

When the mode of feed water passage is upward current water passage, an anion exchange resin layer is disposed in a lower portion of each ion depletion compartment 1 with other ion exchange resin layer(s) disposed thereon. Specific possible modes of such layer arrangement include those of layer arrangement similar to but different only in upward or downward relationship from the above-mentioned modes in the case of downward current water passage.

In filling the ion exchange resins, a cation exchange membrane 4 (or an anion exchange membrane 5) is adhered to one side face of a framework 3, the ion exchange resins are subsequently filled in the internal space portion of the framework 3, and the anion exchange membrane 5 (or the cation exchange membrane 4) is adhered to the other side face of the framework 3 after the filling of the resins, whereby the ion exchange resins are sealed in a space portion formed by the two ion exchange membranes 4, 5 and the framework 3. In this case, it is preferred to provide a partition rack(s) 7 as a partition wall(s) in the framework 3 as shown in FIG. 2 in order to enable the respective ion exchange resins to be independently filled in accordance with the kinds of ion exchange resins to be filled. The number of partition rack(s) may be arbitrary. This figure shows an example wherein three partition racks are provided to partition an ion depletion compartment 1 into four subcompartments A, B, C and D.

In the mode of downward current water passage, the subcompartment A is filled with the anion exchange resin, while the other subcompartments B, C and D are sequentially filled with, for example, the cation exchange resin, the anion exchange resin and the cation exchange resin. In the mode of upward current water passage, the subcompartment D is filled with the anion exchange resin, while the other subcompartments C, B and A are sequentially filled with, for example, the cation exchange resin, the anion exchange resin and the cation exchange resin.

Such provision of the partition rack(s) 7 in the framework 3 can facilitate work involved in filling the respective ion exchange resins, and can maintain the state of partition of the respective ion exchange resin layers just as filled while avoiding mutual mixing of the ion exchange resin layers during transportation or operation of the equipment.

Additionally stated, each partition rack 7 is perforated to form a communication hole 8 capable of passing only water therethrough while not allowing the ion exchange resins to pass therethrough. Numeral 9 refers to a feed water inlet (provided that it becomes a deionized water outlet in the case of upward current water passage), and 10 to a deionized water outlet (provided that it becomes a feed water inlet in the case of upward current water passage).

A plurality of deionization modules 6 having the foregoing structure are juxtaposed separately from each other. Spacers 11, which are watertight members such as rubber packings made up in the form of a quadrilateral frame, are put between the deionization modules 6, 6 to form space portions as the concentration compartments 2. The internal space of each concentration compartment 2 is usually filled with a flow path-forming material such as an ion exchange fiber or a synthetic resin gauze for the purpose of securing a flow path for concentrating water by preventing mutual close attachment of the ion exchange membranes 4, 5.

An anode 12 and a cathode 13 are respectively disposed on the two sides of the foregoing alternate array of the ion depletion compartments 1 and the concentration compartments 2. Partition membranes, though not particularly shown in the figures, are respectively provided near the anode 12 and the cathode 13. A space portion between one such partition membrane and the anode 12 is formed as an anode compartment 14, while a space portion between the other partition membrane and the cathode 13 is formed as a cathode compartment 15.

In the figures, numeral 16 refers to a feed water inflow line, 17 to a deionized water outflow line, 18 to a concentrating water inflow line, 19 to a concentrating water outflow line, 20 to electrode water inflow lines, and 21 to electrode water outflow lines.

When deionized water is to be produced using the equipment having the foregoing structure, feed water is flowed into the ion depletion compartments 1 via the feed water inflow line 16 and concentrating water is flowed into the concentration compartments 2 via the concentrating water inflow line 18, while electrode waters are respectively flowed into the anode compartment 14 and the cathode compartment 15 via the electrode water inflow lines 20, 20. Additionally stated, the same water as feed water being fed into the ion depletion compartments 1 is usually fed as concentrating water. On the other hand, a voltage is applied between the anode 12 and the cathode 13 to flow a DC electric current in a direction normal to the direction of flow of feed water and concentrating water.

The present invention will now be described in detail by taking as an example a case where feed water is supplied according to the downward current water passage mode, and ion exchange resin layers in each ion depletion compartment 1 are an anion exchange resin layer 22a, a cation exchange resin layer 23a, an anion exchange resin layer 22b and a cation exchange resin layer 23b disposed in this order from above, as shown in FIG. 1.

Feed water fed into each ion depletion compartment 1 in the downward current direction first flows down in the anion exchange resin layer 22a. On ther other hand, concentrating water is fed into the concentration compartments 2 according to the mode of upward current water passage in the opposite direction to the current direction of feed water.

When feed water first passes through the anion exchange resin layer 22a, anions as impurity ions in feed water are removed. When it next passes through the cation exchange resin layer 23a, cations as impurity ions are removed. Subsequently, the foregoing deionization is repeated to obtain deionized water. This deionized water flows out via the deionized water outflow line 17.

Impurity ions removed from feed water in the ion depletion compartments 1 are transferred to the concentration compartments 2 across the ion exchange membranes. Specifically, anions are attracted toward the anode 12 to be transferred to the adjoining concentration compartments 2 across the anion exchange membranes 5, while cations are attracted toward the cathode 13 to be transferred to the adjoining concentration compartments 2 across the cation exchange membranes 4.

Concentrating water flowing in the concentration compartments 2 receives the transferred anions and cations, and flows out as concentrate containing impurity ions concentrated therein via the concentrating water outflow line 19. Additionally stated, electrode waters flowed into the anode compartment 14 and the cathode compartment 15 via the electrode water inflow lines 20 flow out via the electrode water outflow lines 21.

When feed water is first passed through the respective anion exchange resin layers 22a in the ion depletion compartments, the silica removal rate is improved. The reason for this is believed to be as follows:

Specifically, it is believed that, when feed water first comes into contact with the anion exchange resin, anions alone of impurity ions are primarily subjected to deionization and those anions alone are transferred to the concentration compartments 2 while leaving cations in the anion exchange resin layers 22a in the ion depletion compartments 1 temporarily to yield alkalis in an amount corresponding to that of the cations, with the result that the feed water temporarily becomes so alkaline that the degree of dissociation of silica can be improved consequently to increase the amount of ions being dissociated from silica and transferred to the concentration compartments to enable an improvement in silica removal rate.

Herein, the silica removal rate can be further increased by setting the current direction of feed water opposite to the current direction of concentrating water according to the present invention. The reason for this is believed to be as follows:

Specifically, since feed water flowed into the ion depletion compartments 1 flows down while being gradually deionized, the impurity ion concentration thereof is lowered as it goes toward the bottom portions of the ion depletion compartments. The ion concentration is therefore highest in top portions of the ion depletion compartments (where the anion exchange resin layers 22a are disposed). On the other hand, since concentrating water flowed into the concentration compartments 2 rises up while receiving ions migrating from the ion depletion compartments, the ion concentration is increased as it goes toward the top portions of the concentration compartments. Thus, the top portions of the ion depletion compartments and the top portions of the concentration compartments are equally high-ion-concentration portions to provide a situation that the two kinds of portions highest in ion concentration and high in conductivity in the ion depletion compartments and the concentration compartments are adjacent to each other along the flow of a DC electric current.

As a result, the electric current density in the portions of the anion exchange resin layers 22a is heightened to produce a function of further promoting the migration of anions into the concentration compartments. Further promotion of the migration of anions makes the alkalinity of feed water further stronger in the portions of the anion exchange resin layers 22a in the ion depletion compartments, thereby further increasing the degree of dissociation of silica. As a result, the amount of ions being dissociated from silica and transferred to the concentration compartments can be remarkably increased, whereby the silica removal rate can be greatly improved.

The dissociation equilibrium formula of silica is as follows.

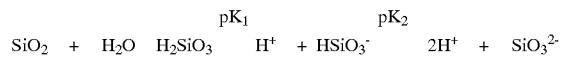

wherein $pK_1$ and $pK_2$ are dissociation constants; and $pK_1$=9.8 and $pK_2$=12.16.

According to the process of the present invention, the alkalinity of feed water in the portions of the anion exchange resin layers 22a in the ion depletion compartments becomes stronger than according to conventional processes to provide a pH necessary and sufficient for dissociating silica to an ionic state of $HSiO_3^-$ or $SiO_3^{2-}$. According to the present invention, therefore, silica can be removed either in the form of $HSiO_3^-$ or in the form of $SiO_3^{2-}$. Since the removal of it in the form of $SiO_3^{2-}$ as a bivalent ion requires an electric current twice as high as that in the removal of it in the form of $HSiO_3^-$ as a monovalent ion to cause an economically inadvisable increase in electric power consumption, it is preferably removed in the form of $HSiO_3^-$. For that reason, it is preferred to effect deionization under such conditions that the pH of feed water becomes 9.5 to 11.0 in the portions of the anion exchange resin layers 22a in the ion depletion compartments.

Additionally stated, the present invention is effective in removing such components as have generally been said to be comparatively hard to remove because they are weak electrolytes, and is therefore so effective in removing, for example, carbonic acid ($CO_2$) in addition to silica that the efficiency of removal thereof can be improved.

Examples of the present invention will now be described.

EXAMPLES

Industrial water of a quality as shown in Table 1 was treated with reverse osmosis equipment to obtain permeate water of a quality as shown in the same Table. This permeate water was used as feed water and concentrating water to be passed through ion depletion compartments and concentration compartments, respectively, in electrodeionized water production equipment comprising four juxtaposed deionization modules (linear velocity of feed water: about 40 m/hr). While flowing an electric current of about 1 A, deionization was effected to produce deionized water.

In this case, the arrangement of ion exchange resin layers in the ion depletion compartments and the conditions concerning the current directions of feed water and concentrating water were variously varied as shown below for effecting deionization treatment.

Example 1

An anion exchange resin layer having a height of 300 mm, a cation exchange resin layer having a height of 100 mm, an anion exchange resin layer having a height of 100 mm, and a cation exchange resin layer having a height of 100 mm were disposed in each ion depletion compartment in this order from the feed water inlet's side thereof. Feed water was passed in the downward current direction, while concentrating water was passed in the upward current direction.

Example 2

An anion exchange resin layer having a height of 300 mm, and a mixed ion exchange resin layer formed of an anion exchange resin and a cation exchange resin (anion exchange resin:cation exchange resin mixing ratio=1:2 in terms of volume ratio) and having a height of 300 mm were disposed in each ion depletion compartment in this order from the feed water inlet's side thereof. Feed water was passed in the downward current direction, while concentrating water was passed in the upward current direction.

Comparative Example 1

Substantially the same as in Example 1 except for the mode of water passage. As for the mode of water passage, feed water and concentrating water were both passed in the downward current direction.

Comparative Example 2

Substantially the same as in Example 2 except for the mode of water passage. As for the mode of water passage, feed water and concentrating water were both passed in the downward current direction.

Comparative Example 3

An ion exchange resin mixture of an anion exchange resin and a cation exchange resin (anion exchange resin:cation exchange resin mixing ratio=1:2 in terms of volume ratio) was filled in each ion depletion compartment to form a mixed ion exchange resin layer having a height of 600 mm. Feed water was passed in the downward current direction, while concentrating water was passed in the upward current direction.

Comparative Example 4

Substantially the same as in Comparative Example 3 except for the mode of water passage. As for the mode of water passage, feed water and concentrating water were both passed in the downward current direction.

The qualities of the resulting deionized waters are shown in Table 2.

As is apparent from the results, it is understood that the silica removal rate can be so greatly improved according to the present invention that the quality of deionized water as a whole is good to an extent close to that of pure water.

Additionally stated, as is apparent from the results in Table 2, the resistivity of deionized water is greatly improved according to the present invention as compared with those in Comparative Examples 1 to 4. Such an improvement in resistivity demonstrates that not only the silica removal rate but also the carbonic acid removal rate is improved according to the process of the present invention.

Industrial Applicability

Deionized water produced according to the present invention can be used in a variety of industrial or research facilities, etc. in the semiconductor manufacturing industry, the pharmaceutical industry, the food industry, etc. Since the present invention is excellent in removal of silica, deionized water can be beneficially sued as good-quality one in various industries and the like.

TABLE 1

|  | Industrial Water | RO Permeate Water |
|---|---|---|
| Conductivity ($\mu$S/cm) | 278 | 5.0 |
| pH | 6.7 | 5.3 |

TABLE 1-continued

|  | Industrial Water | RO Permeate Water |
|---|---|---|
| Total Cations (mg $CaCO_3$/l) | 114 | 1.2 |
| Total Anions (mg $CaCO_3$/l) | 126 | 1.5 |
| Mineral Acids (mg $CaCO_3$/l) | 74 | 0.3 |
| $HCO_3^-$ (mg $CaCO_3$/l) | 40 | 1.2 |
| $SiO_2$ (mg $CaCO_3$/l) | 12 | 0.1 |
| $H_2CO_3$ (mg $CaCO_3$/l) | 18 | 14.5 |

TABLE 2

|  | Deionized Water | |
|---|---|---|
|  | Silica Removal Rate (%) | Resistivity (MΩ · cm) |
| Ex. 1 | at least 95 | at least 17 |
| Ex. 2 | at least 95 | at least 17 |
| Comp. Ex. 1 | 70–80 | 8–10 |
| Comp. Ex. 2 | 70–80 | 8–10 |
| Comp. Ex. 3 | at most 60 | at most 1 |
| Comp. Ex. 4 | at most 60 | at most 1 |

What is claimed is:

1. A process for producing deionized water by eletro-deionization wherein an anion exchange material and a cation exchange material are filled between cation exchange membranes and anion exchange membranes to form ion depletion compartments, concentration compartments are provided on both sides of said ion depletion compartments with said cation exchange membranes or said anion exchange membranes therebetween, and said ion depletion compartments and said concentration compartments are disposed between an anode and a cathode, and wherein feed water is flowed into said ion depletion compartments with application of a voltage while flowing concentrating water into said concentration compartments to remove impurity ions in feed water for production of deionized water; wherein the feed water and the concentrating water are flowed into said ion depletion compartments and said concentration compartments, respectively, in such a way that the direction of flow of feed water being fed into said ion depletion compartments is opposite to the direction of flow of concentrating water being fed into said concentration compartments, and wherein the feed water flowed into said ion depletion compartments is first passed through respective anion exchange material layers.

2. A process for producing deionized water by electro-deionization as claimed in claim 1, wherein an anion exchange material layer, and a mixed ion exchange material layer of an anion exchange material and a cation exchange material are disposed in each ion depletion compartment in this order from the feed water inlet's side thereof, and wherein feed water is passed through the respective ion exchange material layers in the order of such layer arrangement.

3. A process for producing deionized water by electro-deionization wherein an anion exchange material and a cation exchange material are filled between cation exchange membranes and anion exchange membranes to form ion depletion compartments, concentration compartments are provided on both sides of said ion depletion compartments with said cation exchange membranes or said anion exchange membranes therebetween, and said ion depletion compartments and said concentration compartments are disposed between an anode and a cathode, and wherein feed water is flowed into said ion depletion compartments with application of a voltage while flowing concentrating water into said concentration compartments to remove impurity ions in feed water for production of deionized water; wherein the feed water and the concentrating water are flowed into said ion depletion compartments and said concentration compartments, respectively, in such a way that the direction of flow of feed water being fed into said ion depletion compartments is opposite to the direction of flow of concentrating water being fed into said concentration compartments, and wherein an anion exchange material layer and a cation exchange material layer are disposed in each ion depletion compartment in this order from the feed water inlet's side thereof, and wherein feed water is passed through the respective ion exchange material layers in the order of such layer arrangement.

4. A process for producing deionized water by electro-deionization as claimed in claim 3, wherein at least two sets of an anion exchange material layer and a cation exchange material layer disposed in this order for a layer-built set of the ion exchange materials are disposed in such a way as to repeat such layer arrangement, and wherein feed water is passed through respective ion exchange material layers in the order of the resulting layer arrangement.

5. A process for producing deionized water by electro-deionization wherein an anion exchange material and a cation exchange material are filled between cation exchange membranes and anion exchange membranes to form ion depletion compartments, concentration compartments are provided on both sides of said ion depletion compartments with said cation exchange membranes or said anion exchange membranes therebetween, and said ion depletion compartments and said concentration compartments are disposed between an anode and a cathode, and wherein feed water is flowed into said depletion compartments with application of a voltage while flowing concentrating water into said concentration compartments to remove impurity ions in feed water for production of deionized water; wherein the feed water and the concentrating water are flowed into said ion depletion compartments and said concentration compartments, respectively, in such a way that the direction of flow of feed water being fed into said ion depletion compartments is opposite to the direction of flow of concentrating water being fed into said concentration compartments, and wherein an anion exchange material layer, a cation exchange material layer, and a mixed ion exchange material layer of an anion exchange material and a cation exchange material are disposed in each ion depletion compartment in this order from the feed water inlet's side thereof, and wherein feed water is passed through the respective ion exchange material layers in the order of such layer arrangement.

6. A process for producing deionized water by electro-deionization as claimed in claim 5, wherein at least two sets of an anion exchange material layer and a cation exchange material layer disposed in this order for a layer-built set of the ion exchange materials are disposed in such a way as to repeat such layer arrangement with said mixed ion exchange material layer disposed in the next place, and wherein feed water is passed through respective ion exchange material layers in the order of the resulting layer arrangement.

* * * * *

UNITED STATES PATENT AND TRADEMARK OFFICE
CERTIFICATE OF CORRECTION

PATENT NO. : 6,248,226 B1
DATED : June 19, 2001
INVENTOR(S) : Yasutaka Shinmei et al.

It is certified that error appears in the above-identified patent and that said Letters Patent is hereby corrected as shown below:

<u>Title page,</u>
Item [54], In the Title, delete the word "TECHNIQUE"

Signed and Sealed this

Fourth Day of June, 2002

*Attest:*

*Attesting Officer*

JAMES E. ROGAN
*Director of the United States Patent and Trademark Office*